United States Patent
Mikawa et al.

(10) Patent No.: US 9,708,997 B2
(45) Date of Patent: Jul. 18, 2017

(54) CONTROL DEVICE AND CONTROL METHOD FOR INTERNAL COMBUSTION ENGINE

(71) Applicant: HITACHI AUTOMOTIVE SYSTEMS, LTD., Hitachinaka-shi, Ibaraki (JP)

(72) Inventors: Kentaro Mikawa, Isesaki (JP); Naoki Okamoto, Isesaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 15/114,932

(22) PCT Filed: Sep. 30, 2014

(86) PCT No.: PCT/JP2014/076072
§ 371 (c)(1),
(2) Date: Jul. 28, 2016

(87) PCT Pub. No.: WO2015/114882
PCT Pub. Date: Aug. 6, 2015

(65) Prior Publication Data
US 2016/0348603 A1    Dec. 1, 2016

(30) Foreign Application Priority Data

Jan. 30, 2014    (JP) .................................. 2014-015320

(51) Int. Cl.
*F01L 1/344* (2006.01)
*F02D 41/22* (2006.01)
(Continued)

(52) U.S. Cl.
CPC ............ *F02D 41/222* (2013.01); *F01L 1/352* (2013.01); *F02D 41/009* (2013.01); *F01L 1/344* (2013.01);
(Continued)

(58) Field of Classification Search
CPC ................. F01L 1/344; F01L 2013/103; F01L 2013/111; F01L 2013/113; F01L 2800/11
(Continued)

(56) References Cited

U.S. PATENT DOCUMENTS

| | | | |
|---|---|---|---|
| 2005/0211207 A1* | 9/2005 | Urushihata | F01L 1/024 123/90.17 |
| 2006/0042578 A1 | 3/2006 | Izumi et al. | |

(Continued)

FOREIGN PATENT DOCUMENTS

| | | |
|---|---|---|
| JP | 2006-070753 A | 3/2006 |
| JP | 2006-214386 A | 8/2006 |

(Continued)

*Primary Examiner* — Jorge Leon, Jr.
(74) *Attorney, Agent, or Firm* — Foley & Lardner LLP

(57) ABSTRACT

The present invention relates to a control device and a control method for a variable valve timing mechanism that changes a valve timing by adjusting a rotational speed of a motor. The control device detects a phase angle RA1 based on an output of a crank angle sensor and an output of a cam angle sensor and calculates a change amount $\Delta RA$ of a rotational phase based on a difference between a rotation amount of a sprocket and a rotation amount of the motor. The control device stops calculating change amount $\Delta RA$ when a failure occurs in a motor rotation angle sensor. When a failure occurs in one of the crank angle sensor or the cam angle sensor, the control device stops calculating phase angle RA1 and calculates change amount $\Delta RA$ using a normal one of the sensors and the motor rotation angle sensor.

12 Claims, 9 Drawing Sheets

(51) Int. Cl.
    *F02D 41/00*     (2006.01)
    *F01L 1/352*     (2006.01)
    *F01L 13/00*     (2006.01)

(52) U.S. Cl.
    CPC .... *F01L 2013/103* (2013.01); *F01L 2013/111* (2013.01); *F01L 2013/113* (2013.01); *F01L 2800/11* (2013.01); *F01L 2800/12* (2013.01); *F01L 2820/032* (2013.01); *F01L 2820/041* (2013.01); *F01L 2820/042* (2013.01); *F02D 2041/227* (2013.01); *Y02T 10/40* (2013.01)

(58) Field of Classification Search
    USPC .............................. 123/90.15, 90.17, 90.31
    See application file for complete search history.

(56) References Cited

U.S. PATENT DOCUMENTS

| | | |
|---|---|---|
| 2006/0178803 A1 | 8/2006 | Nakamura |
| 2006/0260573 A1 | 11/2006 | Urushihata et al. |
| 2009/0255510 A1* | 10/2009 | Mashiki ................. F01L 1/352 |
| | | 123/347 |

FOREIGN PATENT DOCUMENTS

| | | |
|---|---|---|
| JP | 2007-292038 A | 11/2007 |
| JP | 4123127 B2 | 7/2008 |

\* cited by examiner

FIG. 6
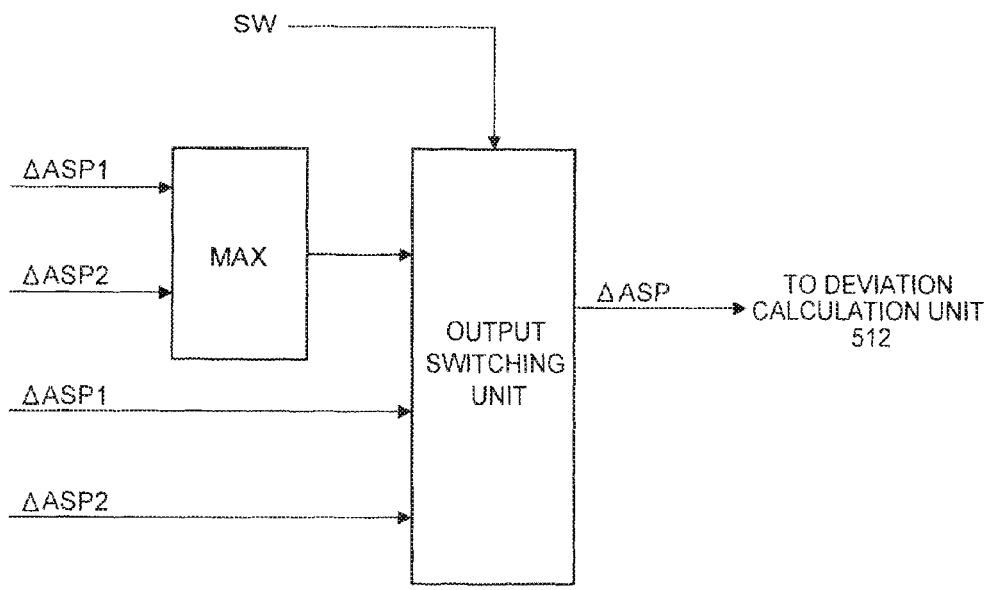
FIG. 7
| FAILURE DETERMINATION | | OUTPUT OF OUTPUT SWITCHING UNIT |
|---|---|---|
| CAM ANGLE SENSOR | CRANK ANGLE SENSOR | |
| BEFORE FAILURE EVALUATION | BEFORE FAILURE EVALUATION | SELECTION UNIT OUTPUT |
| BEFORE FAILURE EVALUATION | AFTER FAILURE DETERMINATION | ΔASP1 |
| AFTER FAILURE DETERMINATION | BEFORE FAILURE DETERMINATION | ΔASP2 |
FIG. 8
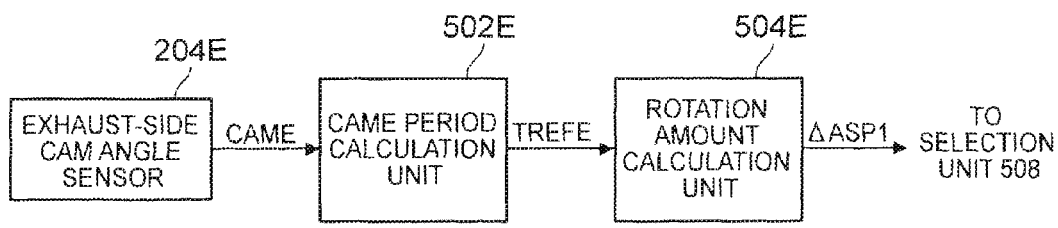

CONTROL DEVICE AND CONTROL METHOD FOR INTERNAL COMBUSTION ENGINE

TECHNICAL FIELD

The present invention relates to a control device and a control method for an internal combustion engine including a variable valve timing mechanism that changes a rotational phase of a cam shaft with respect to a crank shaft by adjusting a rotational speed of a motor.

BACKGROUND ART

Patent Document 1 discloses a control device of a variable valve timing apparatus that changes rotational phase of a cam shaft with respect to a crank shaft to change a valve timing by adjusting a rotational speed of a motor based on a half rotational speed of a rotational speed of the crank shaft.

In this control device, every time a cam angle signal is output from a cam angle sensor, a measured value of a valve timing is obtained based on the cam angle signal and a crank angle signal output from a crank angle sensor, and a change amount of the valve timing is obtained based on a difference between a rotational speed of a motor and a half value of a rotational speed of a crank shaft in a predetermined calculation period so that a final measured value of the valve timing is calculated based on the measured value of the valve timing and the change amount of the valve timing.

REFERENCE DOCUMENT LIST

Patent Document

Patent Document 1: Japanese Patent No. 4123127

SUMMARY OF THE INVENTION

Problems to be Solved by the Invention

In a case where a sensor for detecting a rotational phase of a cam shaft with respect to a crank shaft fails in the middle of a change in rotational phase and the detection of the rotational phase is stopped, even if an operation of stopping the change in rotational phase is performed to stop the detection of the rotational phase, inertia of a variable valve timing mechanism changes the rotational phase and, consequently, an actual rotational phase is excessively advanced or retarded with respect to a target depending on an operating state.

The excessive advancement or retardation of the actual rotational phase with respect to the target, a collision against a stopper for restricting a variable range of the rotational phase might occur, an interference might occur between an engine valve whose valve timing is changed by a variable valve timing mechanism and a piston, or in a case where a valve timing of an intake valve is variable, a closed timing of the intake valve might be retarded after a bottom dead center so that an engine stall due to a shortage of intake air occurs.

The present invention has been made in view of the foregoing problems, and has an object of continuing detection of a rotational phase of a cam shaft with respect to a crank shaft even with a failure in part of sensors for detecting the rotational phase.

Means for Solving the Problems

Thus, a control device according to the present invention includes: a first rotation amount calculation unit that obtains a first rotation amount of a cam sprocket of the cam shaft per a predetermined time based on the crank angle signal; a second rotation amount calculation unit that obtains a second rotation amount of the cam sprocket per the predetermined time based on the cam angle signal; a selection unit that selects a larger one of the first rotation amount or the second rotation amount; and a phase change amount detection unit that detects a change amount of the rotational phase from the rotation amount of the cam sprocket selected by the selection unit and a rotation amount of the rotational shaft of the motor obtained based on an output of the motor rotation angle sensor.

A control method according to the present invention includes the steps of: obtaining a first rotation amount of a cam sprocket of the cam shaft per a predetermined time based on the crank angle signal; obtaining a second rotation amount of the cam sprocket per the predetermined time based on the crank angle signal; selecting a larger one of the first rotation amount or the second rotation amount; and detecting a change amount of the rotational phase from the larger one of the first rotation amount or the second rotation amount and a rotation amount of the rotational shaft of the motor obtained based on an output of the motor rotation angle sensor.

Effects of the Invention

According to the present invention, even when an abnormality occurs in one of the sensors, detection of the rotational phase can be continued. Thus, control of the variable valve timing mechanism based on a detection result of the rotational phase can be continued so that excessive advancement or retardation of an actual rotational phase with respect to a target can be reduced.

BRIEF DESCRIPTION OF THE DRAWINGS

FIG. 6 is a functional block diagram illustrating another example of a selection output process of an angle change amount ΔASP according to the embodiment of the present invention.

FIG. 7 illustrates output characteristics of an output switching unit in the functional block diagram of FIG. 6.

FIG. 8 is a functional block diagram illustrating a calculation process of an angle change amount ΔASP1 using an exhaust-side cam angle sensor according to the embodiment of the present invention.

MODE FOR CARRYING OUT THE INVENTION

An embodiment of the present invention will be described hereinafter.

Figure 1:
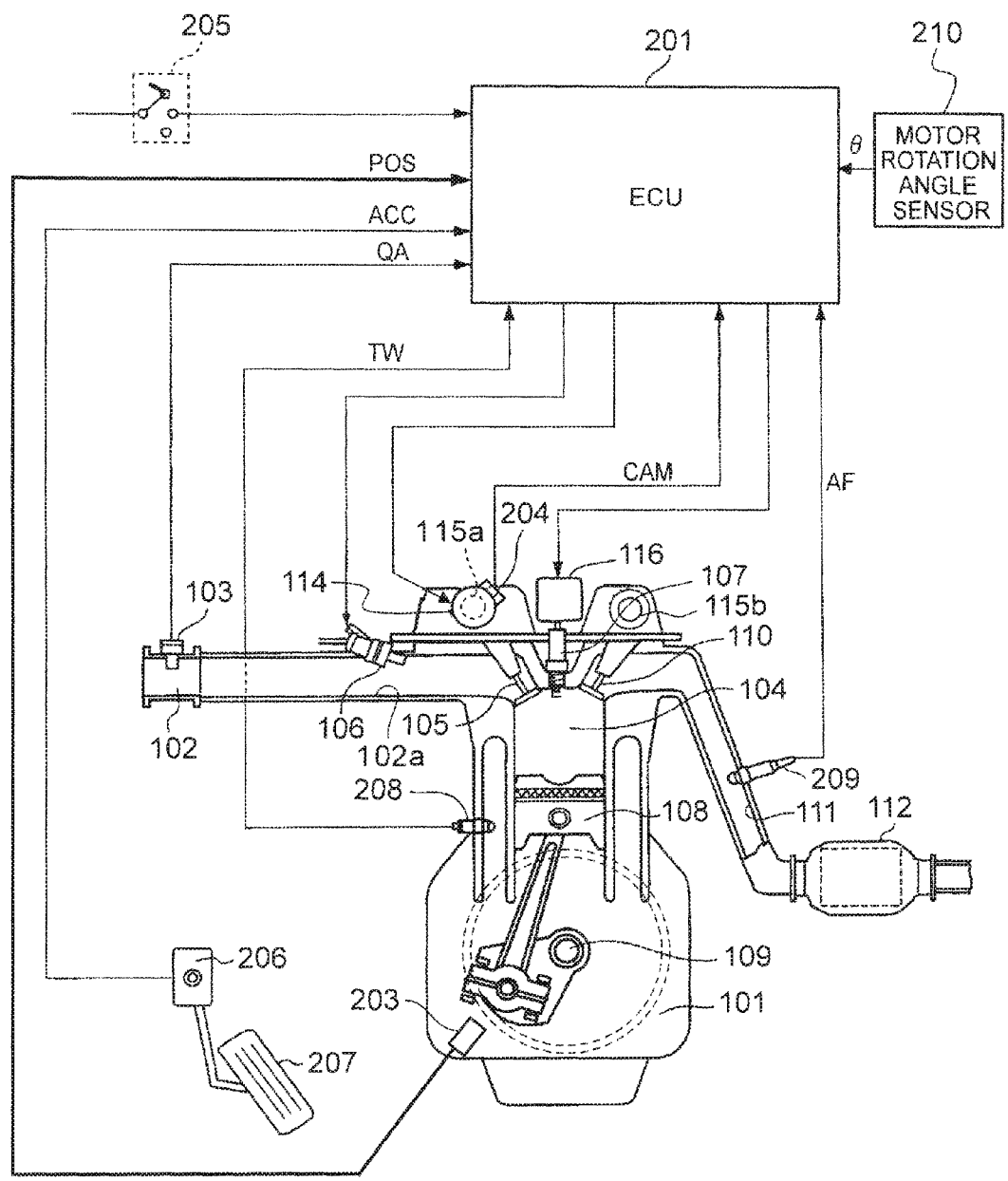
FIG. 1 is a system diagram of an internal combustion engine according to an embodiment of the present invention.

FIG. 1 illustrates an example of an internal combustion engine to which a control device and a control method according to the present invention are applied.

An internal combustion engine 101 is mounted on a vehicle and is used as a power source.

An intake duct 102 of internal combustion engine 101 is provided with an intake air amount sensor 103 for detecting an intake air flow rate QA of internal combustion engine 101.

An intake valve 105 opens or closes an inlet of a combustion chamber 104 of each cylinder.

A fuel injection valve 106 is disposed at an intake port 102a upstream of intake valve 105 for each cylinder.

Internal combustion engine 101 illustrated in FIG. 1 is a so-called port-injection internal combustion engine in which fuel injection valve 106 injects fuel into intake port 102a, but may be a so-called in-cylinder direct injection internal combustion engine in which fuel injection valve 106 injects fuel directly into combustion chamber 104.

The fuel injected from fuel injection valve 106 is sucked into combustion chamber 104 through intake valve 105 together with air, ignites and is burnt with spark ignition caused by an ignition plug 107. Under a pressure of this combustion, a piston 108 is pushed down toward a crank shaft 109 so that crank shaft 109 is rotationally driven.

An exhaust valve 110 opens or closes an outlet of combustion chamber 104. When exhaust valve 110 is opened, exhaust gas in combustion chamber 104 is discharged to an exhaust pipe 111.

A catalyst converter 112 including, for example, a three-way catalyst is disposed in exhaust pipe 111, and purifies exhaust air.

Intake valve 105 is opened with rotation of an intake cam shaft 115a rotationally driven by crank shaft 109. Exhaust valve 110 is opened with rotation of an exhaust cam shaft 115b rotationally driven by crank shaft 109.

Variable valve timing mechanism 114 is an electric variable valve timing mechanism that continuously changes a phase of a valve operating angle of intake valve 105, that is, a valve timing of intake valve 105, in an advanced or retarded direction by changing a relative rotational phase angle of intake cam shaft 115a with respect to crank shaft 109 by using a motor as an actuator.

An ignition module 116 for supplying ignition energy to ignition plug 107 provided for each cylinder is directly attached to ignition plug 107. Ignition module 116 includes an ignition coil and a power transistor for controlling a current flow to the ignition coil.

A control device 201 including a microcomputer receives signals from sensors and switches and performs a calculation process depending on a program previously stored in a memory so that manipulated variables of devices such as fuel injection valve 106, variable valve timing mechanism 114, and ignition module 116 are calculated and output.

As well as receiving an output signal of intake air amount sensor 103, control device 201 receives output signals from, for example, crank angle sensor 203 for outputting a rotation angle signal POS of crank shaft 109, an accelerator opening degree sensor 206 for detecting a depression amount, that is, an accelerator opening degree ACC, of an accelerator pedal 207, a cam angle sensor 204 for outputting a rotation angle signal CAM of intake cam shaft 115a, a water temperature sensor 208 for detecting a temperature TW of a coolant of internal combustion engine 101, an air-fuel ratio sensor 209 disposed in exhaust pipe 111 upstream of catalyst converter 112 and configured to detect an air-fuel ratio AF based on an oxygen concentration in exhaust air, and a motor rotation angle sensor 210 for detecting a rotation angle of a motor (motor 12 in FIG. 2) as an actuator of variable valve timing mechanism 114, and also receives a signal of an ignition switch 205 as a main switch for operating and stopping internal combustion engine 101.

Rotation angle signal POS output from crank angle sensor 203 is a pulse signal for each unit crank angle, and one or more pulses miss at each crank angle corresponding to a stroke phase difference between cylinders.

Crank angle sensor 203 may be configured to output rotation angle signal POS for each unit crank angle and a reference crank angle signal for each crank angle corresponding to a stroke phase difference between cylinders. Here, a portion where rotation signal POS misses or an output position of a reference crank angle signal for each unit crank angle represents a reference piston position of each cylinder.

The unit crank angle is, for example, 10 degrees. The stroke phase difference between cylinders refers to an ignition interval, and is a crank angle of 180 degrees in a four-cylinder mechanism.

Cam angle sensor 204 outputs rotation angle signal CAM for each crank angle corresponding to a stroke phase difference between cylinders.

Here, intake cam shaft 115a rotates at a half speed of a rotational speed of crank shaft 109. Thus, in a case where internal combustion engine 101 is a four-cylinder mechanism and a crank angle corresponding to a stroke phase difference between cylinders is 180 degrees CA, the crank angle of 180 degrees CA corresponding to a rotation angle of 90 degrees of intake cam shaft 115a. That is, cam angle sensor 204 outputs rotation angle signal CAM at every 90-degree rotation of intake cam shaft 115a.

Rotation angle signal CAM is a signal for distinguishing a cylinder at a reference piston position, and is output as a pulse having a characteristic indicating a cylinder number for each crank angle corresponding to a stroke phase difference between cylinders.

For example, in a case where internal combustion engine 101 is a four-cylinder mechanism and ignition occurs in the order of first cylinder, a third cylinder, a fourth cylinder, and a second cylinder, for example, cam angle sensor 204 outputs one pulse signal, three pulse signals, four pulse signals, and two pulse signals at each 180 degrees of crank angle so that a cylinder at a reference piston position can be specified based on the number of pulses. Rotation angle signal CAM may represent a cylinder number based on a pulse width or amplitude, instead of a cylinder number based on the number of pulses.

Figure 2:
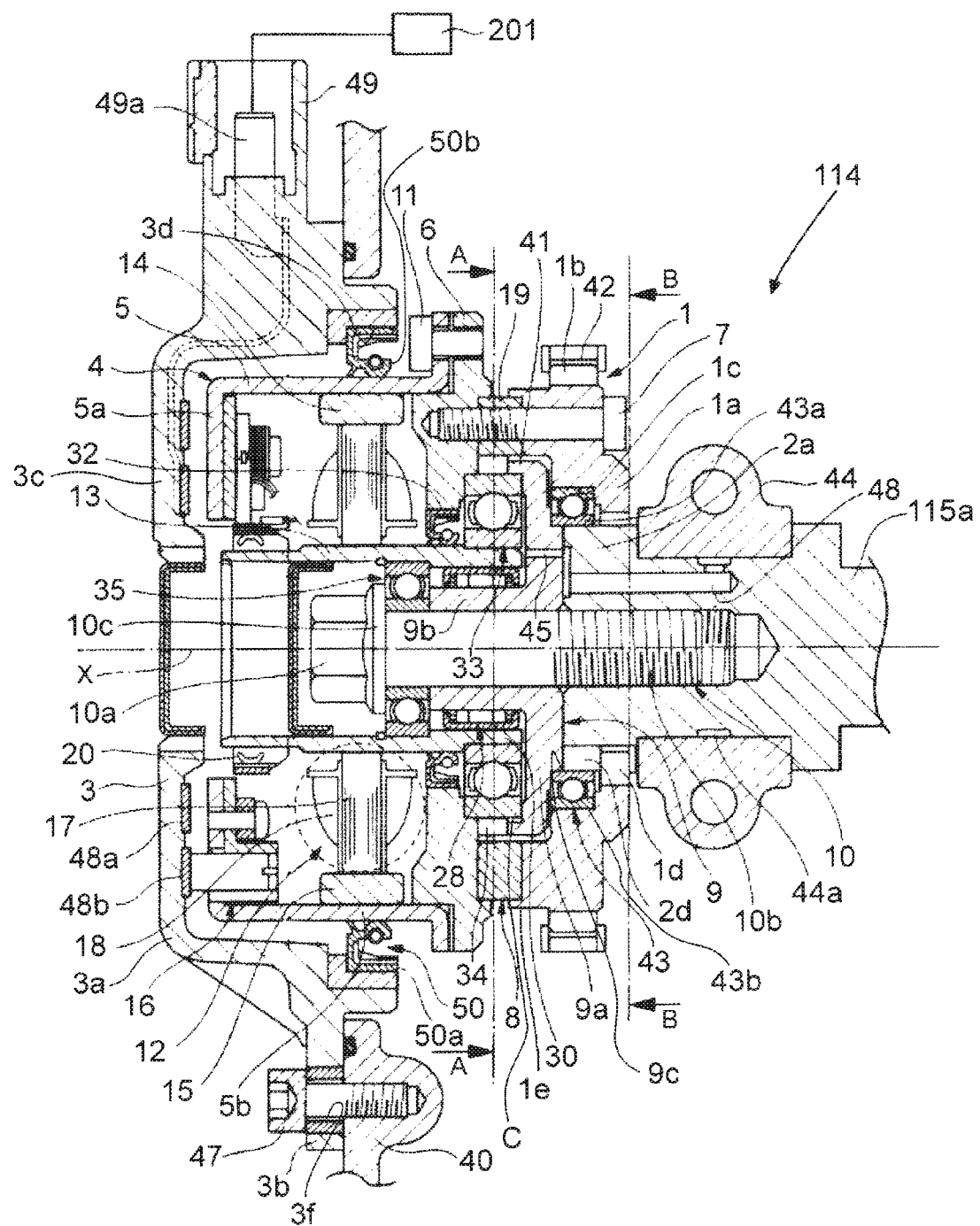
FIG. 2 is a cross-sectional view illustrating a variable valve timing mechanism according to an embodiment of the present invention.
Figure 3:
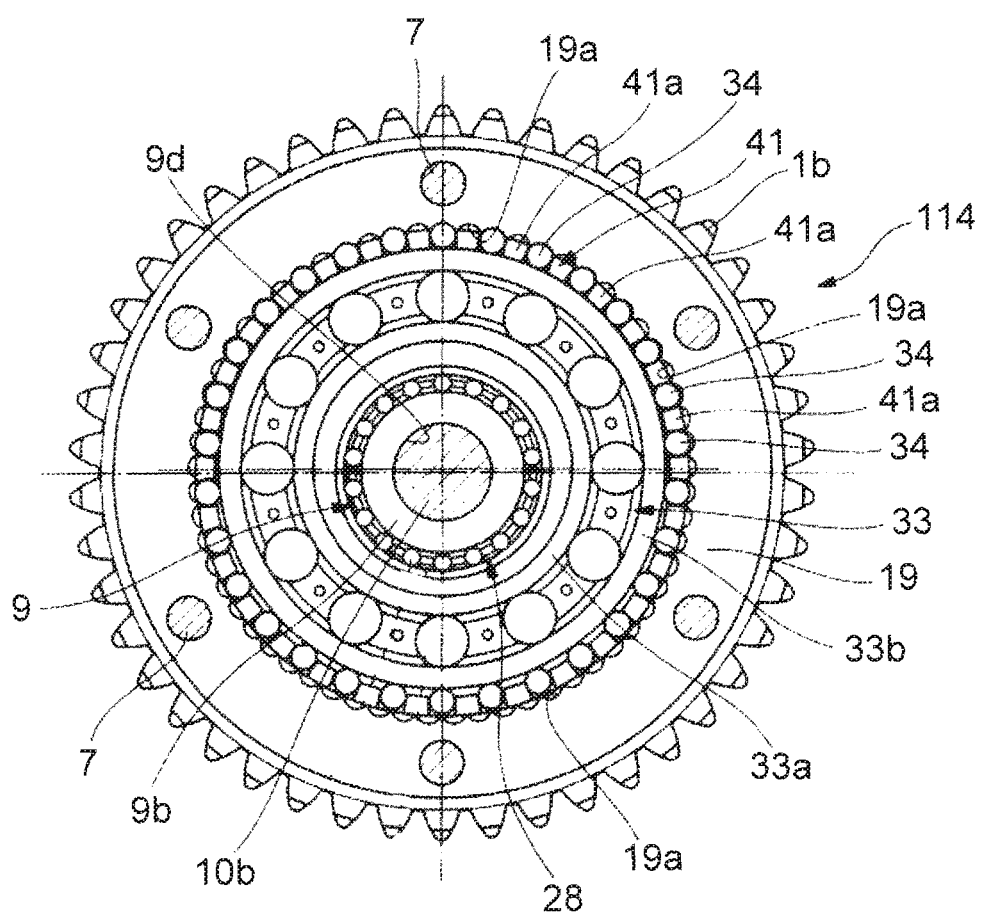
FIG. 3 is a cross-sectional view illustrating the variable valve timing mechanism according to the embodiment of the present invention taken along line A-A in FIG. 2.
Figure 4:
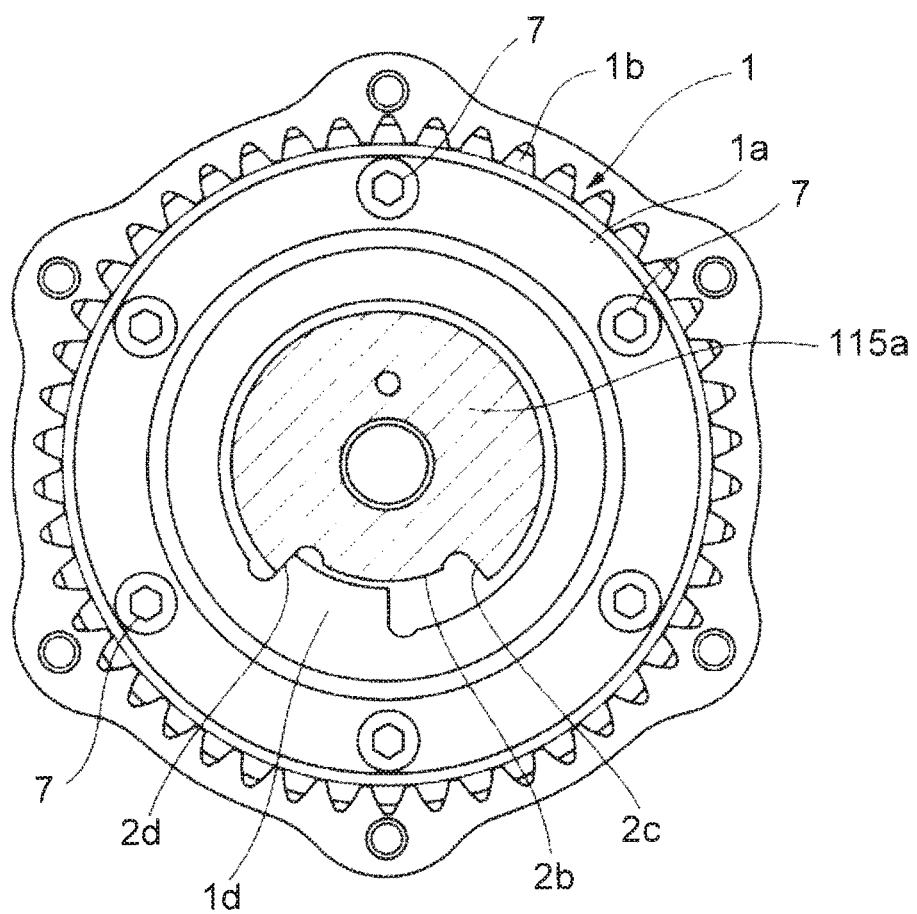
FIG. 4 is a cross-sectional view illustrating the variable valve timing mechanism according to the embodiment of the present invention taken along line B-B in FIG. 2.

FIGS. 2 to 4 illustrate an example of a configuration of variable valve timing mechanism 114.

The configuration of variable valve timing mechanism 114 is not limited to that illustrated in FIGS. 2 to 4, and a known variable valve timing mechanism that can change a rotational phase of a cam shaft with respect to a crank shaft by adjusting a rotational speed of a motor may be suitably employed.

Variable valve timing mechanism 114 includes a timing sprocket (cam sprocket) 1 that is a driven rotation body to be rotationally driven by crank shaft 109 of internal combustion engine 101, intake cam shaft 115a that is rotatably supported on a cylinder head with a bearing 44 interposed therebetween and rotates by a torque transmitted from timing sprocket 1, a cover member 3 disposed forward of timing sprocket 1 and fixed to a chain cover 40 with a bolt, and a phase change mechanism 4 that is disposed between timing sprocket 1 and intake cam shaft 115a and changes a relative rotational phase angle of intake cam shaft 115a with respect to timing sprocket 1.

Timing sprocket 1 includes a sprocket body 1a and a gear portion 1b integrally arranged at the outer periphery of sprocket body 1a and configured to receive a torque from crank shaft 109 through a wound timing chain 42.

Timing sprocket 1 is rotatably supported on intake cam shaft 115a by a third ball bearing 43 interposed between a circular groove 1c formed on the inner periphery of sprocket body 1a and the outer periphery of a flange 2a integrally provided at a front end of intake cam shaft 115a.

An annular projection 1e is integrally formed at an outer rim of a front end of sprocket body 1a.

An annular member 19 coaxially disposed at the inner periphery of annular projection 1e and including an internal gear 19a serving as a mesh part with a corrugated pattern on the inner periphery of internal gear 19a and an annular plate 6 are fastened together with bolts 7 and axially fixed to the front end of sprocket body 1a.

As illustrated in FIG. 4, a projection 1d that is an arc-shaped engaged part is circumferentially formed to a predetermined length on part of an inner peripheral surface of sprocket body 1a.

A cylindrical housing 5 projecting forward and covering a speed reducer 8 described later of phase change mechanism 4 and components of electric motor 12 are fixed to an outer peripheral portion of a front end of plate 6 with bolts 11.

Housing 5 is made of an iron-based metal and functions as a yoke, and an annular plate-shaped holding portion 5a is integrally formed at a front end of housing 5. The entire outer periphery of housing 5 including holding portion 5a is covered with a cover member 3 with a predetermined gap.

Intake cam shaft 115a includes a driving cam (not shown) for opening intake valve 105 at the outer periphery thereof, and a driven member 9 that is a driven rotation body is axially bonded to a front end of intake cam shaft 115a with cam bolts 10.

As illustrated in FIG. 4, a groove portion 2b that is an engagement portion with which projection 1d of sprocket body 1a is engaged is formed in flange 2a of intake cam shaft 115a along a circumference thereof.

Groove portion 2b is in an arc shape having a predetermined length along the circumference. Within this length range, both ends of projection 1d respectively abuts on edge portions 2c and 2d circumferentially opposing these ends so that relative rotation positions of intake cam shaft 115a with respect to timing sprocket 1 at maximum advanced position and at maximum retarded position are restricted.

That is, the stopper for mechanically restricting the variable range of the phase angle of intake cam shaft 115a with respect to crank shaft 109 is constituted by projection 1d and groove portion 2b, and the range of angle where projection 1d is movable in groove portion 2b is a variable range of a phase angle of intake cam shaft 115a with respect to crank shaft 109, that is, a variable range of the valve timing of intake valve 105.

A flanged bearing portion 10c is integrally formed at an edge of a shank 10b of a head 10a of cam bolt 10, and an external thread to be screwed to an internal thread formed from an end of intake cam shaft 115a toward an internal axis is formed on the outer periphery of shank 10b.

Driven member 9 is made of an iron-based metal material, and as illustrated in FIG. 3, includes a disk portion 9a formed at a front end and a cylindrical portion 9b integrally formed at a rear end.

An annular stepped projection 9c having substantially the same outer diameter as that of flange 2a of intake cam shaft 115a is integrally provided in disk portion 9a at substantially a center in a radial direction of a rear end surface of disk portion 9a.

The outer periphery of stepped projection 9c and the outer periphery of flange 2a are inserted into the inner periphery of an inner ring 43a of third ball bearing 43. An outer ring 43b of third ball bearing 43 is press fitted into an inner peripheral surface of circular groove 1c of sprocket body 1a.

Holders 41 for holding rollers 34 are integrally provided at the outer periphery of disk portion 9a.

Holders 41 project from the outer periphery of disk portion 9a in the same direction as cylindrical portion 9b, and are constituted by a plurality of slender projections 41a substantially regularly spaced from one another along the circumference.

An insertion hole 9d through which shank 10b of cam bolt 10 is inserted is formed through cylindrical portion 9b at a center thereof. A first needle bearing 28 is provided at an outer periphery of cylindrical portion 9b.

Cover member 3 is made of a synthetic resin material, and includes a cover body 3a protruding in a cup shape and a bracket 3b integrally provided at the outer periphery of a rear end of cover body 3a.

Cover body 3a covers a front end of phase change mechanism 4, that is, entire housing 5 from holding portion 5b forward of housing 5 toward a rear end thereof, with a predetermined spacing. On the other hand, bracket 3b has a substantially annular shape, and a bolt insertion hole 3f is formed through each of six boss portions.

In cover member 3, bracket 3b is fixed to chain cover 40 with bolts 47 interposed therebetween, and inner and outer double slip rings 48a and 48b are embedded and fixed in an inner peripheral surface of a front end 3c of cover body 3a with inner end surfaces thereof being exposed.

An upper end of cover member 3 is provided with a connector part 49 in which a connector terminal 49a connected to slip rings 48a and 48b through a conductive material is fixed.

Connector terminal 49a is supplied with electric power from an unillustrated battery power supply through control device 201.

A large-diameter first oil seal 50 that is a sealing member is interposed between an inner peripheral surface of a rear end of cover body 3a and an outer peripheral surface of housing 5.

First oil seal 50 has a substantially C-shape in transverse cross section, and a cored bar is buried in a base material of synthetic rubber. An annular base 50a at the outer periphery is fitted and fixed into a circular groove 3d formed in an inner peripheral surface of a rear end of cover member 3.

A sealing surface 50b that is configured to abut on the outer peripheral surface of housing 5 is integrally formed at the inner periphery of annular base 50a of first oil seal 50.

Phase change mechanism 4 includes motor 12 disposed at a front end of intake cam shaft 115a and substantially coaxial with intake cam shaft 115a and speed reducer 8 that reduces a rotational speed of motor 12 and transmits the speed to intake cam shaft 115a.

Motor 12 is, for example, a DC motor with a brush, and includes housing 5 that is a yoke integrally rotatable with timing sprocket 1, a motor shaft 13 that is an output shaft rotatably provided in housing 5, a pair of permanent magnets 14 and 15 each having a semi-arc shape and fixed to an inner peripheral surface of housing 5, and a stator 16 fixed to an inner bottom surface of housing holding portion 5a.

Motor shaft 13 has a cylindrical shape and serves as an armature. An iron-core rotor 17 having a plurality of poles is fixed to the outer periphery substantially at an axial center of motor shaft. A magnetic coil 18 is wound around the outer periphery of iron-core rotor 17.

A commutator 20 is press fixed to the outer periphery of a front end of motor shaft 13. A magnetic coil 18 is connected to each divided segment of commutator 20 in the same number as the number of poles of iron-core rotor 17.

Motor shaft 13 is rotatably supported on an outer peripheral surface of shank 10b near head 10a of cam bolt 10 with a needle bearing 28 that is a first bearing and fourth ball bearing 35 that is a bearing disposed at an axial side of needle bearing 28 being interposed therebetween.

A cylindrical eccentric shank 30 constituting a part of speed reducer 8 is integrally provided at a rear end of motor shaft 13 near intake cam shaft 115a.

A second oil seal 32 that is a friction member for preventing leakage of lubricating oil from the inside of speed reducer 8 into motor 12 is provided between an outer peripheral surface of motor shaft 13 and an inner peripheral surface of plate 6. Second oil seal 32 applies a frictional resistance to rotation of motor shaft 13 when an inner peripheral portion of second oil seal 32 elastically comes into contact with the outer periphery of motor shaft 13.

Speed reducer 8 mainly includes eccentric shank 30 that performs eccentric rotation movement, a second ball bearing 33 that is a second bearing provided at the outer periphery of eccentric shank 30, rollers 34 provided at the outer periphery of second ball bearing 33, holders 41 allowing radial movement of rollers 34 while holding rollers 34 in a rolling direction, and driven member 9 integrally provided with holders 41.

A shaft center of a cam surface formed at an outer peripheral surface of eccentric shank 30 is slightly radially eccentric with respect to a shaft center X of motor shaft 13. Second ball bearing 33 and rollers 34, for example, are constituted as a planetary mesh part.

Second ball bearing 33 has a large diameter and substantially radially overlaps first needle bearing 28. An inner ring 33a of second ball bearing 33 is press fixed to the outer peripheral surface of eccentric shank 30. Rollers 34 always abut on an outer peripheral surface of outer ring 33b of second ball bearing 33.

An annular gap C is formed at the outer periphery of outer ring 33b to enable entire second ball bearing 33 to be radially movable, that is, eccentrically movable, with eccentric rotation of eccentric shank 30.

Rollers 34 are fitted into internal gear 19a of annular member 19 while radially moving with the eccentric movement of second ball bearing 33, and radially swing while being circumferentially guided by projections 41a of holders 41.

Lubricating oil is supplied to the inside of speed reducer 8 by a lubricating oil supplying equipment.

Lubricating oil supplying unit includes an oil supply passageway 44a that is formed in bearing 44 of the cylinder head and receives lubricating oil from an unillustrated main oil gallery, an oil supply hole 48 that is axially formed in intake cam shaft 115a and communicates with oil supply passageway 44a through a groove, a small-diameter oil supply hole 45 penetrating along the inner axis of driven member 9 and having one end open to oil supply hole 48 and the other end open near first needle bearing 28 and second ball bearing 33, and large-diameter three oil discharge holes (not shown) penetrating driven member 9.

An operation of variable valve timing mechanism 114 will now be described.

First, when crank shaft 109 of internal combustion engine 101 is rotationally driven, timing sprocket 1 rotates through timing chain 42, and a torque thereof causes motor 12 to synchronously rotate through housing 5, annular member 19, and plate 6.

On the other hand, the torque of annular member 19 is transmitted to intake cam shaft 115a from rollers 34 by way of holders 41 and driven member 9. In this manner, the cam of intake cam shaft 115a opens and closes intake valve 105.

When a relative rotational phase angle of intake cam shaft 115a with respect to crank shaft 109, that is, the valve timing of intake valve 105, is changed by variable valve timing mechanism 114, control device 201 causes current to flow in magnetic coil 17 of motor 12 to drive motor 12. When motor 12 is rotationally driven, this motor torque is transmitted to intake cam shaft 115a through speed reducer 8.

That is, when eccentric shank 30 eccentrically rotates with rotation of motor shaft 13, rollers 34 roll toward one internal gear 19a of annular member 19 across another adjacent internal gear 19a while being radially guided by projections 41a of holders 41 at each one turn of motor shaft 13. This movement is repeated so that rollers 34 rolling contact with internal gears 19a in the circumferential direction.

With this rolling contact of rollers 34, rotation of motor shaft 13 is decelerated and a torque is transmitted to driven member 9. A deceleration ratio used when rotation of motor shaft 13 is transmitted to driven member 9 can be set at any value depending on, for example, the number of rollers 34.

In this manner, forward and reverse relative rotation of intake cam shaft 115a occurs with respect to timing sprocket 1, and a relative rotational phase angle is converted so that an opening/closing timing of intake valve 105 is changed to be advanced or retarded.

Here, the forward and reverse relative rotation of intake cam shaft 115a with respect to timing sprocket 1 is restricted by abutment of each side surface of projection 1d on one of opposing surfaces 2c and 2d of groove portion 2b.

That is, when driven member 9 rotates in the same direction as the rotation direction of timing sprocket 1 with eccentric rotation of eccentric shank 30 so that a side surface of projection 1d abuts on an opposing surface 1c of groove portion 2b, and further rotation in the same direction is restricted. In this manner, the relative rotational phase angle of intake cam shaft 115a with respect to timing sprocket 1 is changed to a maximum advanced position.

On the other hand, when driven member 9 rotates in a direction opposite to the rotation direction of timing sprocket 1, another side surface of projection 1d abuts on another opposing surface 2d of groove portion 2b and further rotation in the same direction is restricted. In this manner, the relative rotational phase of intake cam shaft 115a with respect to timing sprocket 1 is changed to a maximum retarded position.

In this manner, control device 201 variably controls the relative rotational phase angle of intake cam shaft 115a with respect to crank shaft 109, that is, the valve timing of intake valve 105, by controlling a current flow in motor 12 of variable valve timing mechanism 114.

Control device 201 calculates a target phase angle TA based on an operating state of internal combustion engine 101, such as a mechanism load, a mechanism rotational speed, a mechanism temperature, and a starting state, and detects an actual relative rotational phase angle RA of intake cam shaft 115a relative to crank shaft 109.

Target phase angle TA corresponds to, for example, a target advance amount, a target valve timing, and a target conversion angle.

Control device 201 performs feedback control of a rotational phase in which a manipulated variable of electric motor 12 is calculated and output in such a manner that actual relative rotational phase angle RA approaches target phase angle TA. In the feedback control, control device 201 calculates a manipulated variable of electric motor 12 by, for example, proportional-plus-integral control based on a deviation between target phase angle TA and actual relative rotational phase angle RA.

Figure 5:
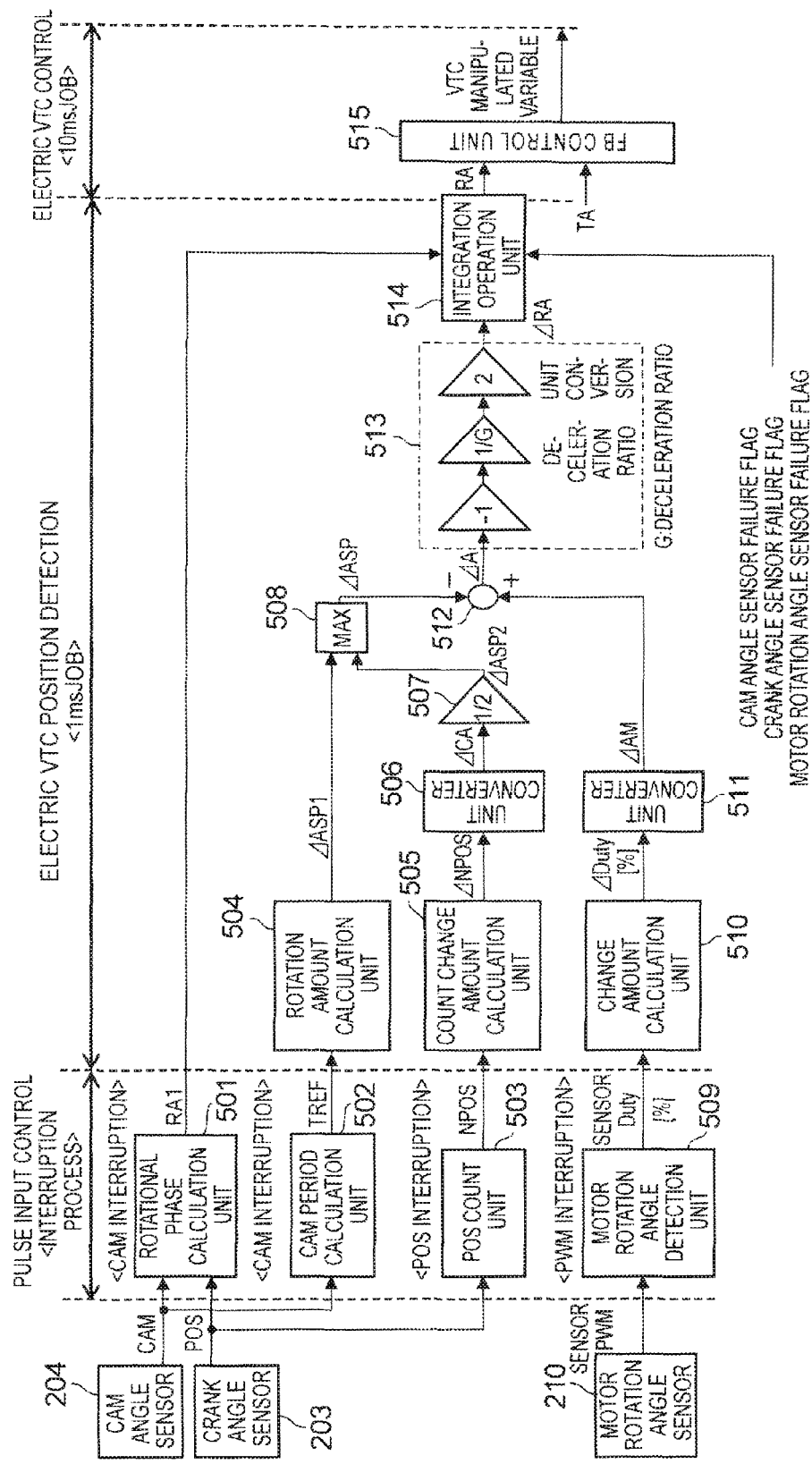
FIG. 5 is a functional block diagram specifically illustrating a detection process of a rotational phase and a rotational phase control according to the embodiment of the present invention.

As illustrated in the functional block diagram of FIG. 5, control device 201 detects actual relative rotational phase angle RA based on outputs of crank angle sensor 203, cam angle sensor 204, and motor rotation angle sensor 210.

A rotational phase calculation unit 501 receives rotation angle signal POS output from crank angle sensor 203 and rotation angle signal CAM output from cam angle sensor 204.

Rotational phase calculation unit 501 calculates a phase angle RA1 [degCA] based on rotation angle signal CAM and rotation angle signal POS in an interruption process at each input of rotation angle signal CAM.

In this embodiment, angle unit degrees CA indicates an angle of crank shaft 109.

Rotational phase calculation unit 501 measures an angle from a reference crank angle position detected based on rotation angle signal POS to an input of rotation angle signal CAM by, for example, angle conversion of an elapsed time based on a count value of rotation angle signal POS and a mechanism rotational speed so that a phase angle RA1 that is a detection value of a relative rotational phase angle of intake cam shaft 115a with respect to crank shaft 109 can be calculated, for example.

Thus, phase angle RA1 detected by rotational phase calculation unit 501 is updated at every input of rotation angle signal CAM, that is, at each crank angle corresponding to a stroke phase difference between cylinders. After the update, a previous detection value is held until a next rotation angle signal CAM is input.

Phase angle RA1 represents an advanced crank angle [degCA] from a maximum retarded position of the valve timing of intake valve 105, and the maximum retarded position of the valve timing corresponding to an initial position or a default position of the valve timing.

Thus, when the valve timing of intake valve 105 is at the maximum retarded position, phase angle RA1=0 degrees CA, and as the valve timing of intake valve 105 is advanced, a calculated value of phase angle RA1 increases.

In a case where a cylinder number is represented based on the number of pulses output as a group of rotation angle signals CAM, rotational phase calculation unit 501 performs a calculation process of phase angle RA1 by an interruption process based on a head pulse signal of the group of pulse signals.

CAM period calculation unit 502 measures a CAM period TREF [ms] that is a generation period of rotation angle signal CAM by an interruption process based on an input of rotation angle signal CAM output from cam angle sensor 204. That is, a difference between a timer value of a previous interruption process and a timer value of a current interruption process is calculated as a generation period TREF [ms] of rotation angle signal CAM.

In a case where internal combustion engine 101 is a four-cylinder mechanism and a stroke phase difference between cylinders is a crank angle of 180 degCA, CAM period calculation unit 502 measures a time necessary for rotation of crank shaft 109 by 180 degCA, that is, a time necessary for timing sprocket 1 to rotate 90 degrees.

POS count unit 503 updates a count value NPOS of rotation angle signal POS by an interruption process at each input of rotation angle signal POS output from crank angle sensor 203. That is, POS count unit 503 increases count values NPOS up to previous value by a predetermined value at each input of rotation angle signal POS.

In an interruption process at each predetermined time Δt, rotation amount calculation unit 504 reads CAM period TREF newly calculated by CAM period calculation unit 502, and from CAM period TREF that has been read, calculates an angle change amount ΔASP1 [deg] per predetermined time Δt of timing sprocket 1, that is, a rotation amount of timing sprocket 1 per predetermined time Δt. Predetermined time Δt can be, for example, 1 ms.

As described above, since CAM period TREF is a time necessary for timing sprocket 1 to rotate by 90 deg, an angle change amount of sprocket 1 per 1 ms is 90 [deg]/CAM period TREF [ms]. Thus, in a case where predetermined time Δt is 1 ms, angle change amount ΔASP1 [deg]=90 [deg]/CAM period TREF [ms].

In an interruption process performed at each predetermined time Δt, count change amount calculation unit 505 reads count value NPOS updated by POS count unit 503 and operates a difference between previously read count value NPOS and currently read count value NPOS as a change amount ΔNPOS of count value NPOS at each predetermined time Δt.

Every time count change amount calculation unit 505 calculates change amount ΔNPOS, unit converter 506 converts change amount ΔNPOS to crank angle change amount ΔCA [degCA] per predetermined time Δt based on an angle period [degCA] of rotation signal POS. That is, unit converter 506 calculates crank angle change amount ΔC A[degCA] per predetermined time Δt, that is, a rotation amount of crank shaft 109 per predetermined time Δt.

A multiplier 507 multiplies crank angle change amount ΔCA by ½ every time unit converter 506 calculates crank angle change amount ΔCA, crank angle change amount ΔCA is converted to angle change amount ΔASP2 [deg] of timing sprocket 1 per predetermined time Δt, that is, a rotation amount of timing sprocket 1 per predetermined time Δt.

Since a rotational speed of timing sprocket 1 is a half of a rotational speed of crank shaft 109, when the rotation angle of crank shaft 109 changes by ΔCA [degCA] per predetermined time Δt, the rotation angle of sprocket 1 changes by ΔCA/2 [deg].

Angle change amount ΔASP1 calculated by rotation amount calculation unit 504 and angle change amount ΔASP2 calculated by multiplier 507 are input to a selection unit 508.

Selection unit 508 selects a larger one of angle change amount ΔASP1 and angle change amount ΔASP2, that is, a larger one of a rotation amount of timing sprocket 1 per predetermined time Δt obtained based on rotation signal CAM output from cam angle sensor 204 or a rotation amount of timing sprocket 1 per predetermined time Δt obtained based on rotation signal POS output from crank angle sensor 203, and outputs the selected amount as a final angle change amount ΔASP.

Motor rotation angle detection unit 509 receives an output signal of motor rotation angle sensor 210.

Motor rotation angle detection unit 509 performs a detection process of a motor rotation angle by an interruption process based on an input of an output signal of motor rotation angle sensor 210. For example, in a case where motor rotation angle sensor 210 indicates a motor rotation angle by a duty ratio % of an output pulse signal, motor rotation angle detection unit 509 measures a duty ratio of an output signal of motor rotation angle sensor 210.

Motor rotation angle sensor 210 may be a known sensor such as an encoder, a hall IC, or a resolver, and motor rotation angle sensor 210 is not limited to sensors whose output pulse signal varies in duty ratio depending on a rotation angle.

Change amount calculation unit 510 calculates a change amount of a detection result per predetermined time Δt as a difference between a result of detection process by motor rotation angle detection unit 509 at a previous point of time and a result of a detection process by motor rotation angle detection unit 509 at a current point of time.

For example, in a case where motor rotation angle sensor 210 indicates a motor rotation angle by a duty ratio of an output pulse signal, change amount calculation unit 510 calculates a change amount [%/Δt] of a duty ratio per predetermined time Δt.

Every time change amount calculation unit 510 calculates a change amount, unit converter 511 converts the change amount to an angle change amount ΔAM [deg] of motor shaft 13 per predetermined time Δt, that is, a rotation amount of motor shaft 13 per predetermined time Δt.

Deviation calculation unit 512 receives angle change amount ΔAM of motor shaft 13 per a calculated per predetermined time Δt calculated by unit converter 511 and angle change amount ΔASP of timing sprocket 1 per predetermined time Δt output from selection unit 508.

Deviation calculation unit 512 calculates a deviation ΔA (ΔA=ΔAM−ΔASP) between angle change amount ΔAM and angle change amount ΔASP, that is, a deviation between a rotation amount of motor shaft 13 per predetermined time Δt and a rotation amount of timing sprocket 1 per predetermined time Δt.

In variable valve timing mechanism 114, in a case where motor shaft 13 rotates at the same rotational speed as sprocket 1, a relative rotational phase angle of intake cam shaft 115a with respect to crank shaft 109 does not change.

On the other hand, in a case where the rotational speed of motor shaft 13 is made higher than the rotational speed of timing sprocket 1 by rotational speed control of motor 12, that is, in a case where the rotation amount of motor shaft 13 per predetermined time Δt is made larger than the rotation amount of timing sprocket 1 per predetermined time Δt, the relative rotational phase angle of intake cam shaft 115a with respect to crank shaft 109 changes to a retarded position.

In contrast, in a case where the rotational speed of motor shaft 13 is made lower than the rotational speed of timing sprocket 1 by rotational speed control of motor 12, that is, in a case where the rotation amount of motor shaft 13 per predetermined time Δt is made smaller than the rotation amount of timing sprocket 1 per predetermined time Δt, the relative rotational phase angle of intake cam shaft 115a with respect to crank shaft 109 changes to an advanced position.

That is, variable valve timing mechanism 114 is a mechanism that changes the valve timing of intake valve 105 to be advanced or retarded depending on a difference between the rotation amount of motor shaft 13 and the rotation amount of timing sprocket 1.

Thus, a converter 513 converts deviation ΔA calculated by deviation calculation unit 512, that is, a difference between the rotation amount of motor shaft 13 per predetermined time Δt and the rotation amount of timing sprocket 1 per predetermined time Δt, to a change amount ΔRA of phase angle RA per predetermined time Δt, based on, for example, a deceleration ratio of speed reducer 8.

Change amount ΔRA is signed angle data. Suppose the positive rotation direction of internal combustion engine 101 and the advance direction of the valve timing are expressed as "positive," to have change amount ΔRA calculated as a negative value when deviation ΔA is positive, converter 513 multiplies deviation ΔA by "−1" in order to reverse the positive and negative relationship of deviation ΔA, and also performs a correction process using a deceleration ratio G of speed reducer 8 and a unit conversion process.

Integration operation unit 514 integrates change amount ΔRA of phase angle RA per predetermined time Δt output from converter 513, using phase angle RA1 updated at each generation of rotation angle signal CAM by rotational phase calculation unit 501 as an initial value, and calculates a final phase angle RA (RA=RA1+∫ΔRA). In other words, integration operation unit 514 calibrates a detection value of phase angle RA based on the integrated value of change amount ΔRA, based on phase angle RA1 at each generation of rotation angle signal CAM.

In this manner, phase angle phase angle RA1 is updated at each generation of rotation angle signal CAM, whereas phase angle RA output from integration operation unit 514 is updated at each predetermined time Δt. In other words, a change in rotational phase while phase angle RA1 detected based on rotation angle signal CAM and rotation signal POS is updated is detected based on a difference between the rotation amount of motor shaft 13 per predetermined time Δt and the rotation amount of sprocket 1 per predetermined time Δt so that the update period of phase angle RA is shorter than the generation period of rotation angle signal CAM.

Feedback control unit 515 is executed by an interruption process at each predetermined time Δt or time Δtc longer than predetermined time Δt, reads a latest value of phase angle RA output from integration operation unit 514 and target phase angle TA calculated by an unillustrated calculation processor, and calculates and outputs a manipulated variable of variable valve timing mechanism 114 so that phase angle RA approaches target phase angle TA. Time Δtc is, for example, about 10 ms.

As described above, a change in rotational phase while phase angle RA1 detected based on rotation angle signal CAM and rotation signal POS is updated is detected based on the difference between the rotation amount of motor shaft 13 per predetermined time Δt and the rotation amount of timing sprocket 1 per predetermined time Δt. Then, the update period of phase angle RA for use in obtaining the manipulated variable of variable valve timing mechanism 114 is sufficiently short even at a low rotational speed of internal combustion engine 101. Thus, generation of overshoot can be suppressed while phase angle RA is converted to target phase angle TA with high response.

Here, suppose an abnormality occurs in motor rotation angle sensor 210 so that calculation of change amount ΔRA cannot be performed, integration operation unit 514 stops updating of phase angle RA at each predetermined time Δt, and outputs data of phase angle RA1 output from rotational phase calculation unit 501 as a final phase angle RA without change at every generation of rotation angle signal CAM.

In this case, although convergence to target phase angle TA decreases, control of approaching phase angle RA to target phase angle TA can be continued so that the valve timing of intake valve 105 can be controlled at an appropriate timing depending on the operating state of internal combustion engine 101.

Integration operation unit 514 receives flags indicating results of failure diagnosis of sensors 203, 204, and 210 for use in detecting a rotational phase.

In a case where calculation of change amount ΔRA cannot be performed because of an abnormality in motor rotation angle sensor 210, that is, the update period of phase angle RA becomes longer than predetermined time Δt, a gain of feedback control is reduced as compared to that in a normal state so that generation of overshoot can be suppressed.

In a case where an abnormality occurs in one of crank angle sensor 203 or cam angle sensor 204, calculation of phase angle RA1 by rotational phase calculation unit 501 cannot be performed. In this case, integration operation unit 514 stops calibration of phase angle RA performed at each generation of rotation angle signal CAM, and continues updating of phase angle RA based on change amount ΔRA.

That is, in a case where an abnormality occurs in one of crank angle sensor 203 or cam angle sensor 204, control device 201 calculates change amount ΔRA from an output of a normal one of the sensors and an output of motor rotation angle sensor 210, and updates phase angle RA at each predetermined time Δt.

In other words, when an abnormality occurs in one of crank angle sensor 203, cam angle sensor 204, or motor rotation angle sensor 210, control device 201 detects a rotational phase based on outputs of two normal sensors and continues feedback control of variable valve timing mechanism 114.

As described above, suppose selection unit 508 selects a larger one of the rotation amount of timing sprocket 1 based on crank angle signal POS and the rotation amount of timing sprocket 1 based on cam angle signal CAM, when an abnormality occurs in one of crank angle sensor 203 or cam angle sensor 204, it is possible to reduce the possibility that the rotational phase is erroneously detected at a retarded side as compared to an actual position and, thus, the valve timing is excessively advanced relative to a target timing.

That is, if angle change amount ΔASP of timing sprocket 1 is detected as a value smaller than an actual value, phase angle RA is detected as an angle at a retarded side as compared to an actual position. Since selection unit 508 selects a larger one of the two rotation amounts, however, it is possible to reduce the possibility that angle change amount ΔASP of timing sprocket 1 is detected as a value smaller than an actual value. Thus, it is possible to reduce the possibility that phase angle RA is detected at a retarded side as compared to an actual position.

If the valve timing of intake valve 105 is controlled to an advanced side relative to a target timing and an open timing IVO of intake valve 105 is earlier than a target timing, an interference might occur between intake valve 105 and piston 108.

On the other hand, since selection unit 508 selects a larger one of two pieces of input rotation amount data, it is possible to reduce the possibility that change amount ΔRA is erroneously detected at a retarded side as compared to an actual position, and thus, occurrence of piston interference due to advancement of the valve timing of intake valve 105 can be suppressed.

The presence of an abnormality in each of crank angle sensor 203, cam angle sensor 204, and motor rotation angle sensor 210 can be suitably detected by known diagnosis techniques such as determination of consistency of detection results among sensors and detection of a pulse period of each sensor.

In the example illustrated in FIG. 5, selection unit 508 selects a larger one of angle change amount ΔASP1 or angle change amount ΔASP2. Alternatively, selection unit 508 may select a smaller one of angle change amount ΔASP1 or angle change amount ΔASP2 in a case where no interference occurs between intake valve 105 and piston 108 even when variable valve timing mechanism 114 is controlled to a maximum advanced position, but when variable valve timing mechanism 114 is controlled to a maximum retarded position, close timing IVC of intake valve 105 is retarded to a bottom dead center BDC or later so that the amount of intake air of internal combustion engine 101 might be insufficient If selection unit 508 selects a smaller one of angle change amount ΔASP1 or angle change amount ΔASP2, it is possible to reduce the possibility that change amount ΔRA is erroneously detected at an advanced side as compared to an actual position, and thus, excessive retardation of the valve timing of intake valve 105 can be suppressed.

In a case where selection unit 508 selects a smaller one of angle change amount ΔASP1 and angle change amount ΔASP2, if a break, for example, occurs in one of crank angle sensor 203 or cam angle sensor 204 so that one of angle change amount ΔASP1 or angle change amount ΔASP2 is calculated to be zero, change amount ΔRA can be calculated based on angle change amount ΔASP of a normal sensor.

As illustrated in FIGS. 6 and 7, one of a larger one of the rotation amount of timing sprocket 1 detected based on crank angle signal POS or the rotation amount of timing sprocket 1 detected based on cam angle signal CAM, the rotation amount of timing sprocket 1 detected based on crank angle signal POS, or the rotation amount of timing sprocket 1 detected based on cam angle signal CAM is selected based on a failure diagnosis result of crank angle sensor 203 and a failure diagnosis result of cam angle sensor 204, and the selected rotation amount is output to deviation calculation unit 512.

In FIG. 6, selection unit 508 selects a larger one of the rotation amount of timing sprocket 1 detected based on crank angle signal POS and the rotation amount of timing sprocket 1 detected based on cam angle signal CAM, and outputs the selected rotation amount to output switching unit 520.

Output switching unit 520 receives an output of selection unit 508, the rotation amount of timing sprocket 1 detected based on crank angle signal POS, and the rotation amount of timing sprocket 1 detected based on cam angle signal CAM, receives a selection instruction signal SW based on the failure diagnosis result of crank angle sensor 203 and the failure diagnosis result of cam angle sensor 204, selects one of three input signals based on selection instruction signal SW, and outputs the selected signal to deviation calculation unit 512.

As illustrated in FIG. 7, selection instruction signal SW is switched among three types of signals based on the failure diagnosis result of crank angle sensor 203 and the failure diagnosis result of cam angle sensor 204.

Specifically, before a failure occurrence is determined in crank angle sensor 203 and cam angle sensor 204, selection instruction signal SW is set as an instruction of selecting an output of selection unit 508. Once a failure in crank angle sensor 203 is determined, selection instruction signal SW is set as an instruction of selecting a rotation amount of timing sprocket 1 detected based on cam angle signal CAM. When a failure in cam angle sensor 204 is determined, selection instruction signal SW is set as an instruction of selecting the rotation amount of timing sprocket 1 detected based on crank angle signal POS.

That is, in a state where failure occurrence is not determined in any of crank angle sensor 203 and cam angle sensor 204, a larger one of the rotation amount of timing sprocket 1 detected based on crank angle signal POS and the rotation amount of timing sprocket 1 detected based on cam angle signal CAM is selected, and when occurrence of a failure is determined in one of crank angle sensor 203 or cam angle sensor 204, the rotation amount of timing sprocket 1 detected based on an output of a normal one of the sensors is selected.

In this manner, when a failure occurs in one of crank angle sensor 203 cam angle sensor 204, the rotation amount of the sprocket 1 based on an output of a normal sensor can be output with stability so that reliability of control can be enhanced.

Based on the failure diagnosis result of crank angle sensor 203 and the failure diagnosis result of cam angle sensor 204, selection unit 508 outputs a detection value of the rotation amount of timing sprocket 1 detected based on crank angle signal POS in a case where both of the sensors are normal, outputs a detection value of the rotation amount of timing sprocket 1 detected based on crank angle signal POS in a case where failure occurrence of cam angle sensor 204 is diagnosed, and outputs a detection value of the rotation amount of the timing sprocket 1 based on cam angle signal CAM in a case where failure occurrence of crank angle sensor 203 is diagnosed.

As illustrated in FIG. 8, in internal combustion engine 101 including the exhaust-side variable valve timing mechanism in which the phase of the valve operating angle of exhaust valve 110 is variable and exhaust-side cam angle sensor 204E for outputting rotation angle signal CAM of an exhaust air cam shaft, angle change amount ΔASP1 is calculated based on an output of exhaust-side cam angle sensor 204E, and is output to, for example, selection unit 508.

That is, in FIG. 8, CAM period calculation unit 502E measures CAM period TREFE [ms] that is a generation period of rotation angle signal CAME by an interruption process based on an input of rotation angle signal CAME output from exhaust-side cam angle sensor 204E, and rotation amount calculation unit 504E reads CAM period TREFE newly calculated by CAM period calculation unit 502E by an interruption process performed at each predetermined time Δt, and calculated angle change amount ΔASP1 [deg] per predetermined time Δt of sprocket 1 from CAM period TREFE that has been read.

In the case of employing the configuration of FIG. 8, if a failure of intake-side cam angle sensor 204 is detected, a phase change of a valve operating angle of exhaust valve 110 by the exhaust-side variable valve timing mechanism is stopped, and the phase is fixed at, for example, a preset default position or a phase at a diagnosis determination point of time.

In this manner, calculation accuracy of angle change amount ΔASP1 based on an output of exhaust-side cam angle sensor 204E is enhanced, and a control accuracy of variable valve timing mechanism 114 in a state where a failure occurs in intake-side cam angle sensor 204 can be enhanced.

In the case of the configuration described above, an operation of the exhaust-side variable valve timing mechanism is stopped when a failure occurs in intake-side cam angle sensor 204. In this case, the influence on running performance of internal combustion engine 101 can be smaller than that in a case where the operation of the intake-side variable valve timing mechanism is stopped.

Integration operation unit 514 calibrates a detection value of phase angle RA based on an integrated value of change amount ΔRA based on phase angle RA1 at each generation of rotation angle signal CAM. In a case where a relationship "angle change amount ΔASP1>angle change amount ΔASP2" is established and selection unit 508 selects and outputs angle change amount ΔASP1, a calibration process of phase angle RA based on phase angle RA1 can be stopped.

That is, in a case where "angle change amount ΔASP1>angle change amount ΔASP2," it is supposed that a failure occurs in crank angle sensor 203 and the accuracy of phase angle RA1 decreases. Thus, the calibration process of phase angle RA based on phase angle RA1 is stopped so that erroneous calibration of phase angle RA can be suppressed.

Figure 9:
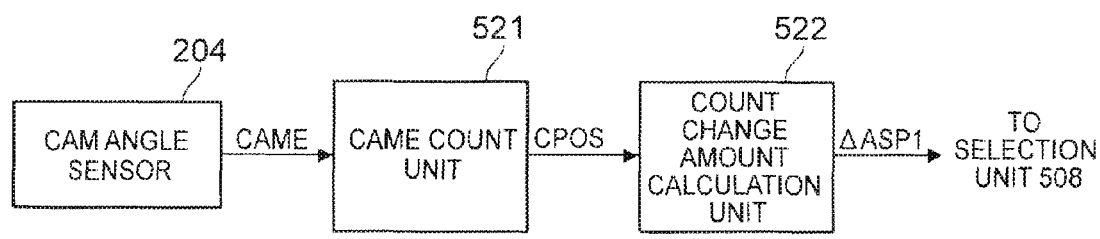
FIG. 9 is a functional block diagram illustrating a calculation process of an angle change amount ΔASP1 using a count value of an output signal of a cam angle sensor according to the embodiment of the present invention.

The functional block diagram of FIG. 5 includes CAM period calculation unit 502 for measuring CAM period TREF [ms] that is a generation period of rotation angle signal CAM output from cam angle sensor 204 and rotation amount calculation unit 504 for calculating angle change amount ΔASP1 [deg] based on CAM period TREF calculated by CAM period calculation unit 502. Instead of these CAM period calculation unit 502 and rotation amount calculation unit 504, a CAM count unit 521 and a count change amount calculation unit 522 may be included as illustrated in FIG. 9.

CAM count unit 521 increases a counter value at each output of rotation angle signal CAM from cam angle sensor 204. Count change amount calculation unit 522 calculates a difference between a previously read counter value and a currently read counter value as a change amount of a counter per predetermined time Δt, and converts this change amount to angle change amount ΔASP1.

Figure 10:
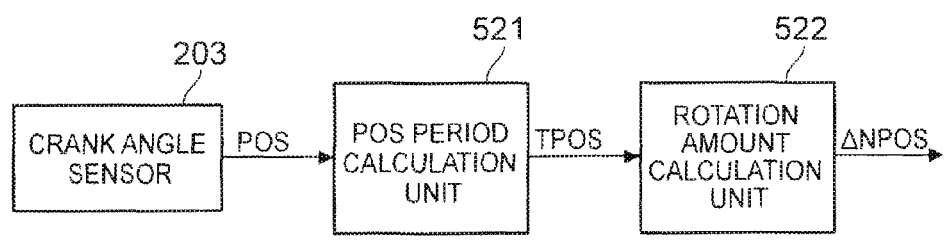
FIG. 10 is a functional block diagram illustrating a calculation process of an angle change amount ΔASP2 based on an output period of a crank angle sensor according to the embodiment of the present invention.

The functional block diagram illustrated in FIG. 5 includes POS count unit 503 for increasing a counter at each input of rotation angle signal POS output from crank angle sensor 203 and count change amount calculation unit 505 that reads count value NPOS updated by POS count unit 503 and calculates change amount ΔNPOS of count value NPOS per predetermined time Δt. Instead of POS count unit 503 and count change amount calculation unit 505, a POS period calculation unit 523 and a rotation amount calculation unit 524 may be included as illustrated in FIG. 10.

POS period calculation unit 523 measures a generation period [ms] of rotation angle signal POS output from crank angle sensor 203. Rotation amount calculation unit 524 converts POS period TPOS calculated by POS period calculation unit 523 to change amount ΔNPOS or angle change amount ΔASP2.

In the case of a configuration in which variable valve timing mechanism 114 rotates the motor shaft in a direction opposite to the rotation direction of the mechanism to advance the phase, variable valve timing mechanism 114 can be operated as indicated by the functional block diagram of FIG. 5. On the other hand, in the case of a configuration in which variable valve timing mechanism 114 rotates the motor shaft in the same direction as the rotation direction of the mechanism so that the phase is advanced, variable valve timing mechanism 114 can be operated as indicated by a functional block diagram illustrated in FIG. 11.

Figure 11:
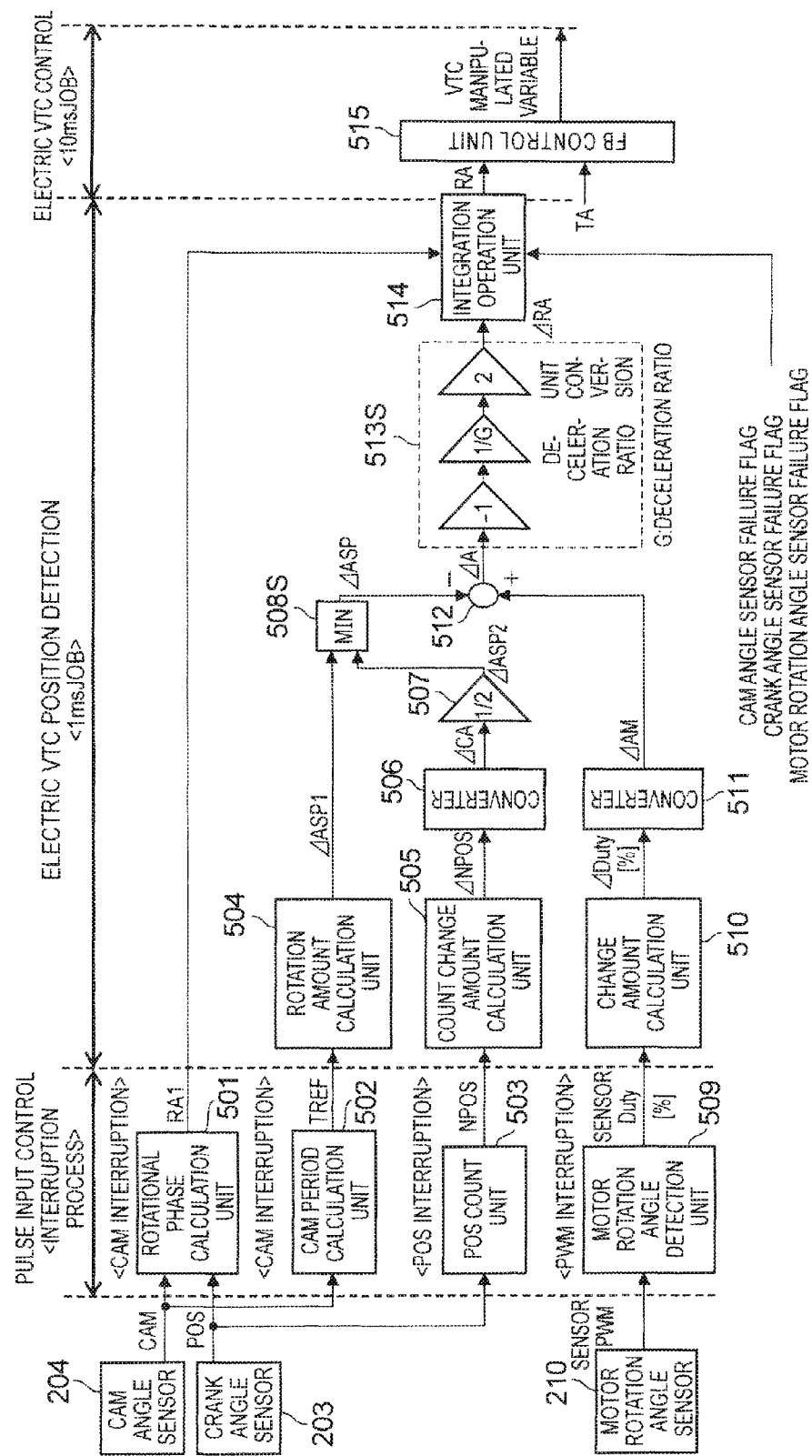
FIG. 11 is a functional block diagram illustrating another example of the detection process of a rotational phase and rotational phase control according to the embodiment of the present invention.

The functional block diagram of FIG. 11 is different from the functional block diagram of FIG. 5 in the configurations of selection unit 508 and converter 513.

Specifically, selection unit 508S illustrated in the functional block diagram of FIG. 11 selects a smaller one of angle change amount ΔASP1 or angle change amount ΔASP2, that is, a smaller one of the rotation amount of sprocket 1 per predetermined time Δt obtained based on rotation signal CAM output from cam angle sensor 204 or the rotation amount of sprocket 1 per predetermined time Δt obtained based on rotation signal POS output from crank angle sensor 203, and outputs the selected amount as a final angle change amount ΔASP.

Since a converter 513S illustrated in the functional block diagram of FIG. 11 does not need to reverse the positive and negative relationship of angle change amount deviation ΔA, converter 513S performs a process of multiplying angle change amount deviation ΔA by "1" and a correction process using deceleration ratio G of speed reducer 8 and a unit conversion process are performed in a manner similar to that in the case of FIG. 5.

In a case where a failure is detected in cam angle sensor 204 or crank angle sensor 203, to enhance a subsequent phase detection accuracy, variable valve timing mechanism 114 is controlled to a default position so that the integrated value of change amount ΔRA in integration operation unit 514 can be cleared to be an initial value.

The default position of variable valve timing mechanism 114 refers to, for example, a maximum retarded position or a maximum advanced position defined by a stopper. The initial value of the integrated value of change amount ΔRA is, for example, zero.

Figure 12:
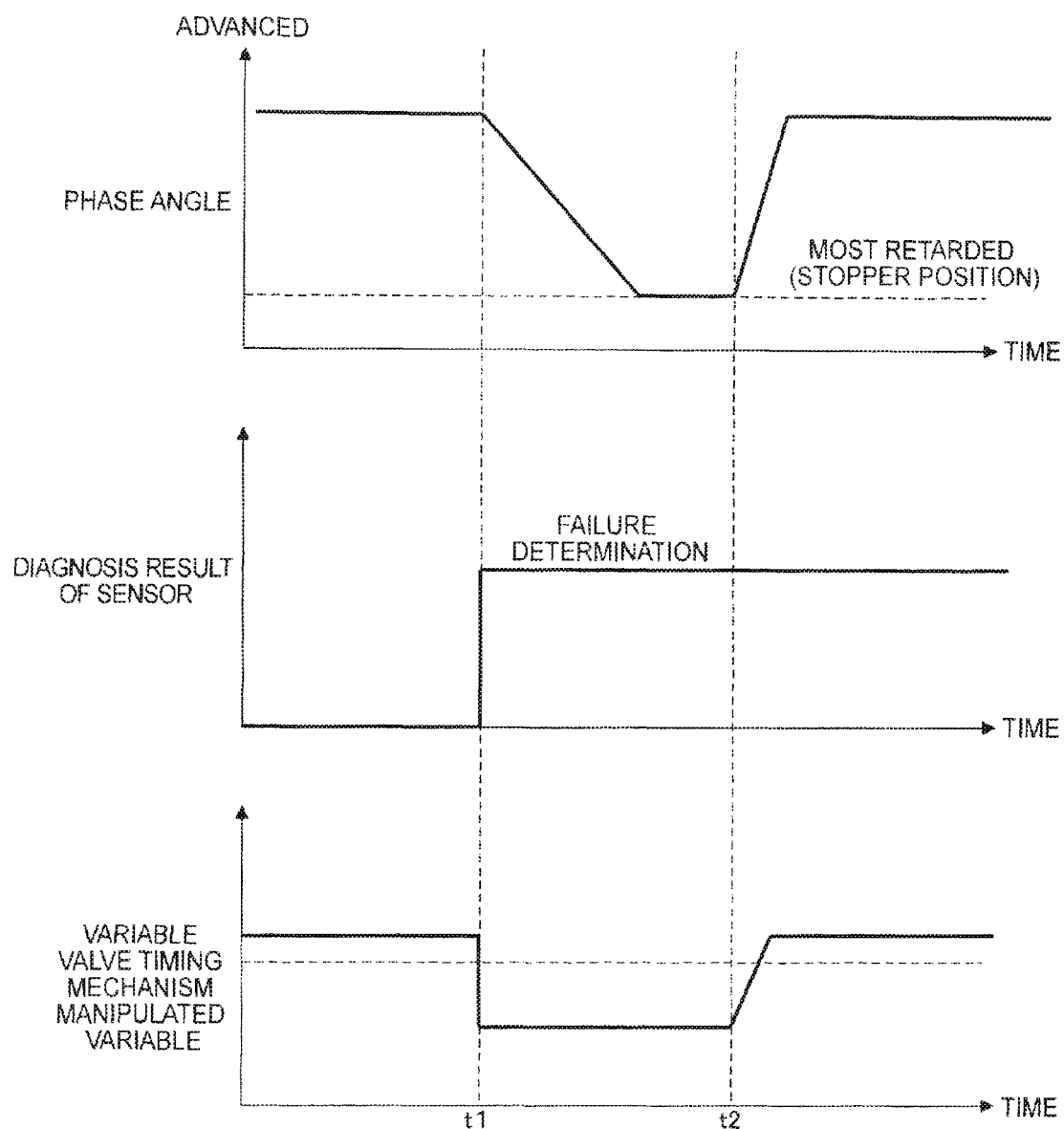
FIG. 12 is a time chart illustrating default control and a clearing process of an integrated value based on failure diagnosis according to the embodiment of the present invention.

A time chart of FIG. 12 illustrates examples of default control and a clearing process of an integrated value based on the failure diagnosis.

In FIG. 12, until occurrence of failure is determined before time t1, variable valve timing mechanism 114 is controlled based on an output of integration operation unit 514. When a failure in cam angle sensor 204 or crank angle sensor 203 is determined at time t1, control of variable valve timing mechanism 114 to the default position is started.

At time t2, when it is detected that variable valve timing mechanism 114 has reached the default position, the integrated value of change amount ΔRA is updated to an initial value, and then, control of approaching an actual phase angle to target phase angle TA is restarted.

In the foregoing description, the present invention has been specifically described with reference to a preferred embodiment. It would be, however, apparent to those skilled in the art that various modifications can be made based on the specific technical idea and teaching of the present invention.

For example, when abnormalities occur in two or three of crank angle sensor 203, cam angle sensor 204 or motor rotation angle sensor 210, control device 201 cannot detect an actual rotational phase, and thus, motor 12 can be controlled so that the rotational phase by variable valve timing mechanism 114 returns to an initial position.

In a variable valve timing mechanism in which the valve timing of exhaust valve 110 is variable, when an abnormality occurs in one of crank angle sensor 203, a cam angle sensor for outputting rotation angle signal CAM of an exhaust air cam shaft, and motor rotation angle sensor 210, a rotational phase of the exhaust air cam shaft with respect to crank shaft 109 can be detected based on outputs of two normal sensors.

In a case where a failure occurs in one of crank angle sensor 203 or cam angle sensor 204 so that phase angle RA1 cannot be detected, a target rotational phase in a failure state is set instead of a target rotational phase in a sensor normal state, and variable valve timing mechanism 114 can be controlled so that an actual rotational phase updated based on change amount ΔRA approaches the target value in the failure state.

When an abnormality occurs in one of crank angle sensor 203, cam angle sensor 204, or motor rotation angle sensor 210, the variable range of the target rotational phase is limited to be narrower than that in a normal state so that excessive advancement or retardation can be reduced.

In addition to the variable valve timing mechanism, a variable operating angle mechanism in which an operating angle of an intake valve or an exhaust valve is variable may be included. In internal combustion engine 101 including the variable valve timing mechanism and the variable operating angle mechanism, when an abnormality occurs in one of crank angle sensor 203, a cam angle sensor 204, or motor rotation angle sensor 210, an increase in operating angle by the variable operating angle mechanism is limited to be narrower than that in a normal state so that occurrence of a piston interference can be reduced.

In the configuration in which selection unit 508 selects a larger one of two rotation amounts, if one of the rotation amount is larger than an upper limit, the other smaller rotation amount is selected and, when an abnormally large rotation amount is calculated due to abnormality of a sensor or a processing circuit of a sensor signal, erroneous selection of a rotation amount can be suppressed.

REFERENCE SYMBOL LIST 12 motor
101 internal combustion engine
105 intake valve
109 crank shaft
114 variable valve timing mechanism
115a intake cam shaft
201 control device
203 crank angle sensor
204 cam angle sensor
210 motor rotation angle sensor

The invention claimed is:

1. A control device for an internal combustion engine, the control device being to be applied to the internal combustion engine, the internal combustion engine including a variable valve timing mechanism that changes a rotational phase of a cam shaft with respect to a crank shaft by adjusting a rotational speed of a motor, a crank angle sensor that outputs a crank angle signal at a predetermined angle position of the crank shaft, a cam angle sensor that outputs a cam angle signal at a predetermined angle position of the cam shaft, and a motor rotation angle sensor that detects a rotation angle of a rotational shaft of the motor, the control device comprising:

an electronic control unit configured to:

obtain a first rotation amount of a cam sprocket of the cam shaft per a predetermined time based on the crank angle signal;

obtain a second rotation amount of the cam sprocket per the predetermined time based on the cam angle signal;

select a larger one of the first rotation amount or the second rotation amount;

detect a change amount of the rotational phase from the larger one of the first rotation amount or the second rotation amount and a rotation amount of the rotational shaft of the motor obtained based on an output of the motor rotation angle sensor; and control the variable valve timing mechanism based on the detected change amount of the rotational phase.

2. The control device for the internal combustion engine according to claim 1, wherein the electronic control unit is further configured to:

detect a first detection value of the rotational phase based on the cam angle signal and the crank angle signal at each output of the cam angle signal;

detect a second detection value of the rotational phase based on an integrated value of the change amount detected using the first detection value as an initial value; and control the variable valve timing mechanism based on the second detection value.

3. The control device for the internal combustion engine according to claim 2, wherein the electronic control unit is further configured to:

stop updating the initial value when an abnormality occurs in one of the crank angle sensor or the cam angle sensor.

4. The control device for the internal combustion engine according to claim 2, wherein the electronic control unit is further configured to:

temporarily control the variable valve timing mechanism to a default position when an abnormality in one of the crank angle sensor or the cam angle sensor is detected; and set the initial value to the default position, instead of the first detection value, after the variable valve timing mechanism has been controlled to the default position.

5. The control device for the internal combustion engine according to claim 4, wherein the default position is a position defined by a stopper.

6. The control device for the internal combustion engine according to claim 4, wherein the cam shaft is an intake cam shaft, and the default position is a maximum retarded position.

7. The control device for the internal combustion engine according to claim 2, wherein the electronic control unit is configured to stop updating of the second detection value when an abnormality occurs in the motor rotation angle sensor.

8. The control device for the internal combustion engine according to claim 2, wherein the electronic control unit is further configured to reduce a gain of control of the variable valve timing mechanism so that the gain is lower than a gain in a normal state when an abnormality occurs in the motor rotation angle sensor.

9. A control method for an internal combustion engine including a variable valve timing mechanism that changes a rotational phase of a cam shaft with respect to a crank shaft by adjusting a rotational speed of a motor, a crank angle sensor that outputs a crank angle signal at a predetermined angle position of the crank shaft, a cam angle sensor that outputs a cam angle signal at a predetermined angle position of the cam shaft, and a motor rotation angle sensor that detects a rotation angle of a rotational shaft of the motor, the method comprising the steps of:

obtaining a first rotation amount of a cam sprocket of the cam shaft per a predetermined time based on the crank angle signal;

obtaining a second rotation amount of the cam sprocket per the predetermined time based on the crank angle signal;

selecting a larger one of the first rotation amount or the second rotation amount;

detecting a change amount of the rotational phase from the larger one of the first rotation amount or the second rotation amount and a rotation amount of the rotational shaft of the motor obtained based on an output of the motor rotation angle sensor; and controlling the variable valve timing mechanism based on the detected change amount of the rotational phase.

10. The control method for the internal combustion engine according to claim 9, further comprising the steps of:

detecting a first detection value of the rotational phase based on the cam angle signal and the crank angle signal at each output of the cam angle signal;

detecting a second detection value of the rotational phase based on an integrated value of the change amount of the rotational phase using the first detection value as an initial value; and controlling the variable valve timing mechanism based on the second detection value.

11. The control method for the internal combustion engine according to claim 10, further comprising the step of stopping updating the initial value when an abnormality occurs in one of the crank angle sensor or the cam angle sensor.

12. The control method for the internal combustion engine according to claim 10, further comprising the steps of:

temporarily controlling the variable valve timing mechanism to a default position when an abnormality in one of the crank angle sensor or the cam angle sensor is detected; and setting the initial value to the default position, instead of the first detection value, after the variable valve timing mechanism has been controlled to the default position.

* * * * *